United States Patent Office 3,042,487
Patented July 3, 1962

3,042,487
SALTS OF DEHYDRATION PRODUCTS OF ACIDS OF PHOSPHORUS AND PROCESS OF MAKING THE SAME
Bruno Blaser, Urdenbach-Dusseldorf, and Karl-Heinz Worms, Dusseldorf, Germany, assignors to Henkel & Cie. G.m.b.H., Dusseldorf-Holthausen, Germany, a corporation of Germany
No Drawing. Filed Jan. 28, 1959, Ser. No. 789,525
12 Claims. (Cl. 23—107)

This invention relates to new salts of heretofore unknown anhydrous acids of phosphorus, and more particularly to new salts of acids of phosphorus having both phosporus atoms with an oxidation number of 5 and an oxidation number of 3, to the free acids and to methods of making the same.

It is one object of this invention to provide new and valuable heretofore unknown anhydrous acids of phosphorus and their salts.

Another object of the present invention is to provide simple and effective processes of producing such heretofore unknown anhydrous acids of phosphorus and their salts.

Other objects and advantages of our invention will become apparent as this description proceeds.

In principle, the heretofore unknown anhydrous acids of phosphorus are obtained by dehydrating products containing phosphorus atoms having oxidation numbers of 5 and 3, which mixtures, in view of their stoichiometric composition, can be regarded as dehydration products of mixtures of orthophosphoric acid and phosphorus acid.

These new salts of anhydrous acids of phosphorus are salts of mixed anhydrides of acids of phosphorus having phosphorus atoms with an oxidation number of 5 (pentavalent phosphorus) and phosphorus atoms with an oxidation number of 3 (trivalent phosphorus). The new anhydrous acids of phosphorus have the two types of phosporus atoms bonded to each other by an anhydride oxygen bridge, a —P$^{III}$—O—P$^{V}$— linkage and have a generic structural formula as follows:

$$\left[ H \!-\! O \!-\! \underset{H}{\overset{O}{\underset{|}{\overset{\|}{P^{III}}}}} \right]_x \!-\! O \!-\! \left[ \underset{\underset{H}{|}}{\overset{O}{\underset{|}{\overset{\|}{P^{V}}}}} \!-\! O \right]_y \!-\! H$$

where $x$ and $y$ are integers from 1 to 4. The simplest and preferred member of the above class of acids is that acid where both $x$ and $y$ are one. Such an acid has the empirical formula H$_3$[HP$_2$O$_6$] and the structural formula $$H\!-\!O\!-\!\underset{H}{\overset{O}{\underset{|}{\overset{\|}{P^{III}}}}}\!-\!O\!-\!\underset{\underset{H}{|}}{\overset{O}{\underset{|}{\overset{\|}{P^{V}}}}}\!-\!OH$$

This acid contains three acid hydrogens and will neutralize three equivalents of base. It is the mixed anhydride of phosphorous acid and phosphoric acid according to the following reaction.

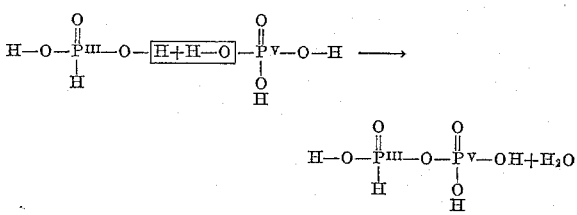

This acid we have named isohypophosphoric acid. It should not be confused with the known hypophosphoric acid having the same empirical formula. Hypophosphoric acid has the same empirical formula H$_4$P$_2$O$_6$ but the structural formula

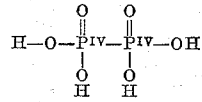

This latter acid has four acid hydrogens and will neutralize four equivalents of base. It moreover undergoes different chemical reactions as outlined below.

The acids of phosphorus have historically been designated as members of a series in which the different phosphorus atoms are identified in terms of valency. These different valence forms are, —3 the phosphonium ion with all valencies satisfied with hydrogen, —1 the theoretical phosphine oxide containing one oxygen atom, +1 the hypophosphorous acid containing 2 oxygen atoms, +3 the phosphorous acid containing 3 oxygen atoms and +5 the phosphoric acid containing 4 oxygen atoms. See "Hackh's Chemical Dictionary," 3rd edition (1944), page 649. We prefer to refer to these variously oxidized compounds of phosphorus as having oxidation numbers of —3, —1, 1, 3 and 5 rather than by valency as the phosphorus atom in each case has five shared electrons and can be thus said to be pentavalent. For purposes of convenience we have designated the oxidation number of the various phosphorus atoms shown in our structural formulas by Roman numerals thus.

PH$_4$X—Phosphonium ion $$\left[ \underset{\underset{H}{|}}{\overset{H}{\underset{|}{\overset{|}{H\!-\!P^{III}\!-\!H}}}} \right]^{+} X^{-}$$

PH$_3$O—Phosphine oxide

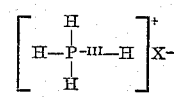

H$_3$PO$_2$—Hypophosphorous acid

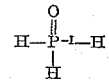

H$_3$PO$_3$—phosphorous acid

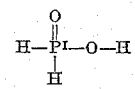

and H$_3$PO$_4$—phosphoric acid

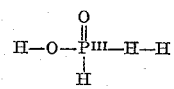

In addition to isohypophosphoric acid, H$_3$[HP$_2$O$_6$] other anhydride acids can be prepared according to the above generic formula wherein either $x$ or $y$ or both is greater than one, such as the following acids.

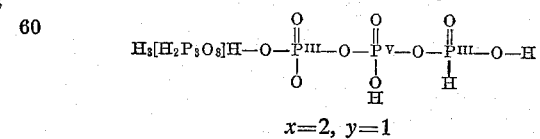

$x=2$, $y=1$

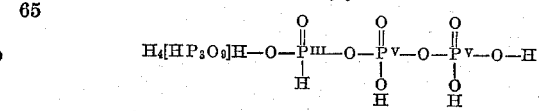

$x=1$, $y=2$

Salts of these acids may be obtained by neutralization of the acids or the salts may be produced directly.

The manner in which the mixed anhydrides of acids of phosphorus used in the production of the new salts are produced is of considerable importance, since the yield of the salts according to the present invention is dependent upon said manner in which these acids are made. It is our theory, without, however, being bound thereby, that said acids are formed by splitting off water from mixtures of phosphorous acid and ortho-phosphoric acid. In large-scale operations, water is split off; for instance, by heating a mixture of said acids, if necessary in a vacuum, i.e. under conditions whereby decomposition does not take place. Such decomposition can readily be detected by the reaction mixture acquiring a yellow color which deepens to a red color on more extensive decomposition.

At the beginning, dehydration can be carried out at higher temperatures; if necessary, at temperatures up to about 200° C. It is, however, advisable to decrease the temperature at the same rate as water escapes from the reaction mixture. The yellow coloration which is observed as soon as decomposition sets in is an excellent criterion for proper adjustment of the temperature during dehydration. Allowance may be made of a slight yellow coloration of the mixture, since such a slight coloration does not involve any appreciable decrease in yield. It is, however, advisable to avoid strong yellow or even red coloration of the mixture. The temperatures are decreased during dehydration to temperatures between about 120° C. and about 70° C. No decomposition is to be feared within this temperature range, provided local overheating is avoided or the reaction time is not unnecessarily prolonged. Within this temperature range decomposition generally sets in only on heating the mixture for several days. Such a prolonged heating, however, is usually not required for the production of the mixed anhydrous acids to be used in the production of salts.

Said starting materials, the mixed anhydrous acids of phosphorus can be produced not only by the above-described method of molecularly dehydrating mixtures of phosphorous acid and ortho-phosphoric acid, but also in other ways; for instance, by mixing oxides of phosphorus having an oxidation number of 3 with acids of phosphorus having an oxidation number of 5, or by mixing acids of phosphorus having an oxidation number of 3 for instance phosphorous acid, with phosphorus pentoxide or with dehydrated acids of phosphorus having an oxidation number of 5. Such molecularly dehydrated acids of phosphorus having an oxidation number of 5 comprise all those acids which, according to their compositions, can be obtained on dehydration of ortho-phosphoric acid, such as, pyrophosphoric acid, tripolyphosphoric acid, metaphosphoric acid, and the polyphosphoric acids which, in their stoichiometric compositions, are between pyrophosphoric acid and metaphosphoric acid.

Mixing of said oxides and acids can be effected at lower or higher temperatures, and the mixture can be kept at such lower or higher temperatures for a shorter or longer period of time if decomposition is avoided. For this purpose, it is necessary to maintain the above-indicted temperature conditions.

The amount of heat generated during mixing varies. For instance, on mixing phosphorous acid with phosphorus pentoxide, a considerable amount of heat is evolved. In this case, it is necessary to avoid decomposition of the reaction mixture by proper cooling. In other cases, for instance on mixing phosphorous acid with metaphosphoric acid, almost no heat is generated. In such cases it may be necessary to raise the temperature of the reaction mixture by supplying heat externally.

The stoichiometric composition of mixtures of phosphorous acid and ortho-phosphoric acid used in the manufacture of the salts of our invention may be visualized according to the following formula:

$$2H_2(HPO_3) + 2H_3PO_4 = 1P_2O_3 + 1P_2O_5 + 6H_2O$$

The dehydration products of such mixtures used in the production of the new salts of our invention, which may also be regarded as mixtures of the acids, anhydro acids, or oxides of phosphorus having an oxidation number of 3 with corresponding compounds of phosphorus, having an oxidation number of 5 may be formulated as follows:

$$2H_2(HPO_3) + 1H_4P_2O_7 = 1P_2O_3 + 1P_2O_5 + 5H_2O$$
$$2H_2(HPO_3) + 2HPO_3 = 1P_2O_3 + 1P_2O_5 + 4H_2O$$
$$2H_2(HPO_3) + 1P_2O_5 = 1P_2O_3 + 1P_2O_5 + 3H_2O$$
$$1P_2O_3 + 2H_3PO_4 = 1P_2O_3 + 1P_2O_5 + 3H_2O$$
$$1P_2O_3 + 1H_4P_2O_7 = 1P_2O_3 + 1P_2O_5 + 2H_2O$$
$$1P_2O_3 + 2HPO_3 = 1P_2O_3 + 1P_2O_5 + 1H_2O$$

By combining a phosphorus compound with a phosphorus atom having an oxidation number of 3 with a phosphorus compound with a phosphorus atom having an oxidation number of 5 as indicated above, or in various other ways, compositions containing various amounts of water may be produced.

The ratio of phosphorus having an oxidation number of 3 to phosphorus having an oxidation number of 5 in said formulas has been arbitrarily assumed to be 1:1. However, this ratio need not be maintained in the starting materials to be converted into their salts according to the present invention. On the contrary, said ratio can vary within wide limits—for instance, between 1:9 and 9:1—and can assume any value whatsoever—for instance, 7:3, 2:1, 3:2, 1:1, 2:3, 1:2, 3:7, or others.

Summarizing the above-given data, the following characteristic formula can be established to represent the stoichiometric composition of the mixed anhydrous acids:

$$(100-a).P_2O_3 + a.P_2O_5 + 100b.H_2O$$

In said formula, $a$ indicates the amount of $P_2O_5$ in mol percent as compared with the sum total of the phosphorus oxides present in the starting materials, said phosphorus oxides containing two phosphorus atoms in their molecules, whereby the numerical value of $a$ may comprise the values 10 to 90 and preferably the values 70 to 30, while $b$ indicates a number the value of which is smaller than 3 and is at least 0.25 and preferably between 1.25 and 2.0.

In the above formula, the compound isohypophosphoric acid, $H_3[HP_2O_6]$ occurs when $a$ has the value 50 and $b$ has the value 2. The compound $H_3[H_2P_3O_8]$ has a value for $a$ of 33⅓ and a value for $b$ of 1.67 and the compound $H_4[HP_3O_9]$ has a value for $a$ of 66⅔ and a value for $b$ of 1.67.

When the mixed anhydrous acids corresponding to the above formula are neutralized, they produce salts of heretofore unknown acids of phosphorus which are new and useful products. Neutralization of the said mixed anhydrous acids is brought about by the addition of solid, liquid or gaseous water-soluble or water-insoluble inorganic or organic acid binding compounds, or by other known methods for neutralizing acid mixtures. Such neutralizing compounds are, for instance, inorganic or organic bases, such as ammonia, gaseous or liquid amines, especially amines with not more than 6 carbon atoms, such as mono-, di-, or triethanol amine, or acid binding alkali metal or alkaline earth metal compounds such as, for instance, the hydroxides, carbonates, or bicarbonates of sodium, potassium, magnesium, calcium, and the like metals.

The mixture of mixed anhydrous acids can be diluted with water before neutralization so that its water content is greater than that corresponding to the above-given stoichiometric composition. It is then, however, advisable to cool the mixture during neutralization, for instance by cooling with ice. After dilution with water, the starting material should be neutralized as rapidly as possible to avoid prolonged contact of the dilute mixture with the acid aqueous starting solution. When working without preliminary dilution with water, the acid mixture is brought together with the solution or suspension of the acid binding or neutralizing compound. For example, the acid mixture is preferably added to the acid binding or neutralizing compound.

If possible, the acid binding or neutralizing compound is employed in such an amount that, after neutralization, the solution, or suspension, is of neutral reaction. When working under conditions whereby the resulting salts precipitate in solid form, the mixture is preferably well kneaded, mixed or ground, so that the precipitated solid salts do not enclose part of the acid mixture and do not withdraw a part of the acid mixture in unneutralized form from contact with the neutralizing agent. Precipitation of solid salts normally occurs on working in the absence of water, or when working with concentrated aqueous solutions, or when passing gaseous neutralizing agents into the starting material, or when adding thereto liquid, anhydrous organic bases, as, for instance, ethanolamines.

Neutralization can also be effected in organic, water-miscible solvents, such as methanol or ethanol, acetone, dioxane, and the like. The same solvents can be used to precipitate the new salts from their aqueous solutions.

The new compounds are useful as components of detergent mixtures and in various other fields where molecularly dehydrated phosphate salts are used.

The alkali metal salts of these mixed anhydrous acids possess the capability of forming complex compounds with polyvalent metals, and are therefore useful as water-softeners and as additives for washing agents and auxiliary washing agents.

The salts of the mixed anhydrides of acids of phosphorus having phosphorus atoms with an oxidation number of 5 and phosphorus atoms with an oxidation number of 3 can also be produced by reacting salts of acids of phosphorus having phosphorus atoms with an oxidation number of 3 with halogen compounds of phosphorus having phosphorus atoms with an oxidation number of 5. Since salts of acids of phosphorus having an oxidation number of 3 are also formed by a reaction of halogen compounds of phosphorus having an oxidation number of 3 with buffered, weakly acid to alkaline aqueous solutions (pH>4), the process can also be carried out by reacting mixtures, of halogen compounds of phosphorus having an oxidation number of 3 and phosphorus having an oxidation number of 5 with such aqueous solutions and in other ways hereinafter described. Another reaction which likewise produces salts of the mixed anhydrides of acids of phosphorus having phosphorus atoms with an oxidation number of 5 and phosphorus atoms with an oxidation number of 3 is the reaction of salts of acids of phosphorus having phosphorus atoms with an oxidation number of 5 with halogen compounds of phosphorus having phosphorus atoms with an oxidation number of 3. These three reactions, can be represented by the following equations.

(1)

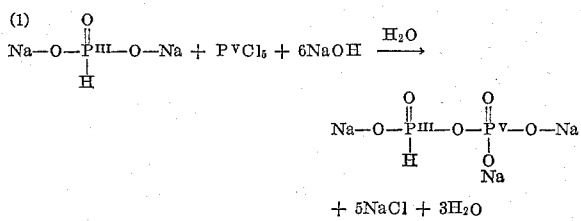

(2)

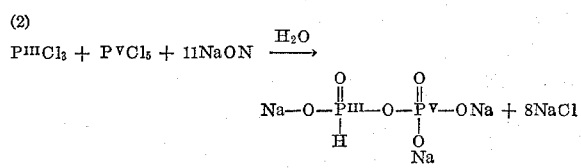

(3)

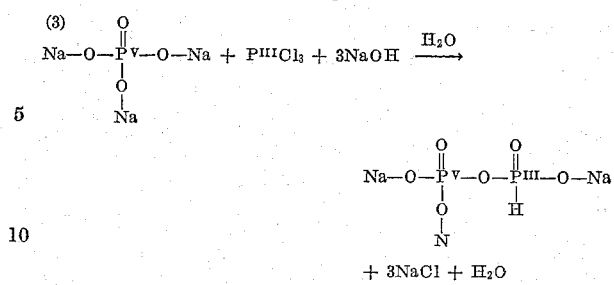

Salts of acids of phosphorus having phosphorus atoms with an oxidation number of 3 which may be used as starting materials according to the first reaction are primarily phosphites and pyrophosphites. It is preferred to react water-soluble salts, i.e. the sodium, potassium, lithium or ammonium salts of these phosphorus compounds. However, water-soluble salts of other cations may also be employed, especially salts derived from organic bases, for example the salts of gaseous or liquid amines, especially those with no more than six carbon atoms, such as mono-, di- or triethanolamine.

Halogen compounds of phosphorus having phosphorus atoms with an oxidation number of 5 which may be employed in the process according to the first reaction include all those wherein at least two chlorine atoms are attached to a phosphorus atom having an oxidation number of 5 especially halogen compounds with three to five chlorine atoms per molecule, such as phosphorusoxychloride (POCl$_3$), pyrophosphorylchloride (P$_2$O$_2$Cl$_4$), phosphoruspentachloride (PCl$_5$), and the corresponding bromine compounds of phosphorus having an oxidation number of 5.

Halogen compounds of phosphorus having phosphorus atoms with an oxidation number of 3 which may be used as starting materials according to the second reaction are primarily phosphorus trichloride (PCl$_3$) and phosphorus tribromide (PBr$_3$). The suitable halogen compounds of phosphorus having phosphorus atoms with an oxidation number of 5 are those enumerated above.

Suitable salts of acids of phosphorus having phosphorus atoms with an oxidation number of 5 which may be used as starting materials according to the third reaction are primarily orthophosphates, but also pyrophosphates, metaphosphates and polyphosphates. It is referred to react the water-soluble salts; that is, the sodium, potassium, lithium or ammonium salts. However, water-soluble salts of other cations, including the salts derived from organic bases may also be employed; for example, salts of gaseous or liquid amines, especially those with no more than six carbon atoms, such as mono-, di- or triethanolamines.

Suitable halogen compounds of phosphorus having phosphorus atoms with an oxidation number of 3 are primarily phosphorus trichloride and phosphorus tribromide.

It has already been pointed out that the ratio of phosphorus having an oxidation number of 3 to phosphorus having an oxidation number of 5 in the reaction mixtures does not necessarily have to be 1:1, but that higher-molecular products may also be formed in which the quantitative ratios of the two phosphorus atoms are different. For this reason, the quantitative ratio of phosphorus having an oxidation number of 3 to phosphorus having an oxidation number of 5 in the starting material may vary within wide limits. The ratio of P$^{III}$ to P$^{V}$ may assume any desired value between 1:9 and 9:1; for example, 7:3, 2:1, 3:2, 1:1, 2:3, 1:2 or 3:7.

The reaction between a salt of an acid of phosphorus and a halogen compound of phosphorus is carried out in the presence of water, the stoichiometric minimum quantity of water being such that it is sufficient to hydrolize all of the halogen atoms still attached to the phosphorus after the reaction. For example, if Z is selected to represent the number of halogen atoms present in the halogen compound of phosphorus per phosphorus atoms, the minimum stoichiometric number of water molecules to be employed per phosphorus atom in the halogen compound of phosphorus will be $Z-1$. This rule may also be analogously applied to the second reaction between mixtures of halogen compounds of phosphorus with aqueous solutions; in other words, the stoichiometrically minimum required amount of water is greater by an amount corresponding to that required for the complete hydrolysis of one of the halogen compounds of phosphorus.

In most instances, however, the reaction is carried out in the presence of substantially larger quantities of water. It is even possible to carry out the reaction in dilute solutions which contain as little as 1% by weight of solid substance. It is preferred, however, to work with solutions whose concentration lies within the range of the saturation concentration of the salts dissolved therein. These solutions may also contain greater or lesser quantities of undissolved starting salts which dissolve in the course of the reaction. For example, the salts of acids of phosphorus used as starting materials and, if necessary, the buffer salts may be stirred with water to form a paste which contains 15 to 20% by weight liquid water, and the halogen compounds of phosphorus may then be added to this paste. In this procedure it is recommended that the reaction mixture be maintained in a sufficiently fluid state by addition of water, so that it remains capable of being stirred during the reaction.

Since the halogen compounds of phosphorus undergo a complete hydrolysis and hydrogen halides are formed, the reaction mixture becomes acid in the course of the reaction. It is therefore advantageous to provide means for maintaining the pH-value of the reaction mixture within the range of 3 to 13, preferably 5 to 10, for example by adding buffer compounds such as carbonates, bicarbonates or hydroxides of the alkalis.

The reaction temperature is adjusted according to the pH-value of the solution. In strongly acid or strongly alkaline solution the danger of a splitting of the reaction products increases with increasing temperatures; consequently, the reaction is preferably carried out at as low a temperature as possible, even as low as the freezing point of the reaction solution, but preferably at temperatures from $-5$ to $+5°$ C. If the reaction is carried out in the neighborhood of neutral reaction, i.e. in a range of pH-values from 6 to 8, the reaction temperature may be increased for example to 50° C.

The isolation of the salts of mixed anhydride of acids of phosphorus having phosphorus atoms with an oxidation number of 5 and phosphorus atoms with an oxidation number of 3 in the molecule is based upon the discovery that these salts are much more readily soluble in water than other salts of acids of phosphorus, especially more soluble than orthophosphates.

When the solutions obtained from any of above reactions including the neutralization reactions are evaporated, preferably in vacuo, at temperatures not exceeding 80° C., preferably at temperatures below 50° C., the limit of solubility of the orthophosphates is first exceeded and they separate out in a form which contains water of crystallization, so that a further concentration of the solution is achieved. During the evaporation, it is recommended to maintain the pH-value, if possible, between 5 and 10, and preferably between 8 and 9, so that a hydrolysis of the salts to be isolated in accordance with this invention is avoided.

Since orthophosphates are more easily precipitated from aqueous solutions by addition of organic water-miscible solvents than the salts of the mixed anhydride of acids phosphorus, which are to be isolated the orthophosphates may also be fractionally precipitated from the solution. After the orthophosphates have been separated out, the salts to be isolated may be obtained by adding additional solvent or by other suitable procedures, for example by evaporating the liquid. Suitable water-miscible organic solvents are those which are completely miscible with water and whose boiling point is not appreciably higher than the boiling point of water. For example, aliphatic alcohols or ether alcohols with 1 to 4 carbon atoms in the molecule and also acetone, methylethylketone, dioxane, and the like, meet this requirement.

The orthophosphates may also be precipitated from the solution with alkali earth metal or heavy metal cations, such as calcium, barium, lead, zinc, and the like.

The reaction mixtures worked up in accordance with the present invention also contain side products which are other salts of acids of phosphorus; for example, orthophosphates, phosphites, pyrophosphites, diphosphites or hypophosphates. If the side products are salts of acids of phosphorus having an oxidation number of 3 they may be separated by partial oxidation. This may readily be accomplished with iodine, which does not attack the salts of the mixed anhydride of acids of phosphorus, even upon prolonged contact. Chlorine, bromine and hydrogen peroxide may also be used, but in that case we recommend the addition of only that quantity of oxidizing agent which is necessary to oxidize all those components of the reaction mixture which are oxidizable with iodine. If an excess of oxidizing agent is employed, it is necessary to proceed with the subsequent separation steps of the reaction mixture as soon as possible in order to avoid a reaction between these oxidizing agents and the salts of the mixed anhydride of acids of phosphorus which are to be isolated.

The salts of acids of phosphorus having phosphorus atoms with an oxidation number of 3 contained in the reaction mixture are partially transformed into phosphates and hypophosphates by oxidation. The hypophosphates are easily separated, similar to the orthophosphates, because of their extremely low solubility in water.

The salts of the mixed anhydride acids of phosphorus having phosphorus atoms with an oxidation number of 5 and phosphorus atoms with an oxidation number of 3, separated from the reaction mixtures in accordance with the above steps possess a capability of forming complex compounds with polyvalent metals and are therefore useful as softeners for water and as additives for washing agents, and the like. In addition, they produce a delaying effect upon the precipitation of calcium carbonate from hard water, even if they are used in less than the stoichiometric quantity.

The following examples will further illustrate the present invention and enable others skilled in the art to understand our invention more completely. However, it must be understood that the present invention is not limited to these examples.

EXAMPLE 1

5.4 gm. of phosphoric acid of the formula $$H_3PO_4.0.5H_2O$$

are mixed with 10.7 gm of phosphorus pentoxide while vigorously stirring the mixture. Thereby, the temperature rises to 60° C. The reaction mixture, corresponding stoichiometrically to metaphosphoric acid of the formula $HPO_3$, is then cooled to room temperature. 16.5 gm. of crystalline anhydrous phosphorous acid of high purity is gradually added thereto while stirring continuously. A homogeneous syrup is obtained with only slight evolution of heat. The stoichiometric composition of the mixture corresponds to the formula:

$$50P_2O_3 + 50P_2O_5 + 200H_2O$$

$$(a=50; b=2)$$

The reaction mixture is allowed to stand at room temperature for 20 hours. Thereafter, 2.3442 gm. of the resulting slightly yellowish product is added drop by drop to a solution of 4 gm. of sodium bicarbonate in 100 cc.

of water cooled to 0° C., while stirring vigorously until the mixture is of neutral reaction.

A new compound of salts of heretofore unknown acid of phosphorus is formed during said neutralization, as is shown by iodometric determination of phosphite in the solution of the neutralized starting mixture after said solution has been rendered bicarbonate-alkaline or, respectively, in its alkaline or acid hydrolysates.

To determine the presence of the new compound or compounds, 100 cc. of the neutralized mixture obtained as described above are made up with water to 500 cc. To 25 cc. each of the resulting solution there is added, if necessary, sodium hydroxide solution or hydrochloric acid until the mixture has attained the normality indicated in the following Table I, and hydrolysis has been completed by allowing the mixture to stand under the conditions also indicated in said table.

The hydrolyzed solution is adjusted to bicarbonate-alkaline reaction immediately after hydrolysis has been completed. Determination of phosphite is carried out according to the method described by Wolf and Jung in "Zeitschrift fuer anorganische Chemie," vol. 201, page 358 (1931.) The following Table I illustrates the results obtained on carrying out the above-indicated tests.

*Table I*
CONDITIONS OF HYDROLYSIS

| Test No. | Hydrolyzing Agent | Temperature, °C. | Duration, Minutes | Consumption of 0.1 N iodine solution in cc. |
|---|---|---|---|---|
| 1 | | | | 5.36 |
| 2 | 0.1 N NaOH | 25 | 30 | 8.90 |
| 3a | 1.0 N NaOH | 25 | 60 | 9.60 |
| 3b | 1.0 N NaOH | 25 | 600 | 13.40 |
| 4 | 0.1 N HCl | 25 | 60 | 14.30 |
| 5 | 2.0 N HCl | 100 | 60 | 14.40 |

The amount of phosphorus acid used in the preparation of the starting material requires, under the above-described working conditions, an iodine consumption of 14.5 cc. In contrast thereto, the actual iodine consumption in test No. 1 amounts to 5.36 cc., i.e. to only 37% of the calculated amount. Iodine values corresponding to those calculated for the amount of phosphorous acid employed in the preparation of the starting mixture are obtained only after hydrolysis by means of hydrochloric acid according to tests 4 and 5. These tests show that the phosphorous acid and the mixture of acids of phosphorus having an oxidation number of 5 have reacted with each other with the formation of compounds that differ in their property of reacting with iodine in bicarbonate solution from that of phosphorous acid. Said new compounds, however, yield phosphorous acid quantitatively on hydrolysis with strong acids.

Acids of phosphorus which show a similar behavior are known. Hypophosphoric acid of the formula $(H_2PO_3)_2$, for instance, on vigorous hydrolysis with acids, is split up into phosphorous acid and phosphoric acid. Said hypophosphoric acid, however, is quite stable in contact with 0.1 N hydrochloric acid at room temperature. The titration result of test 4 of the above given Table I, therefore, excludes the possibility that the presence of hypophosphoric acid in the resulting compound accounts for its reduced iodine consumption. The solution also does not exhibit precipitation reactions which are characteristic of hypophosphoric acid, such as precipitation of its silver salt in phosphoric acid solution.

Pyrophosphorous acid of the formula $H_4P_2O_5$ in bicarbonate-alkaline solution also does not consume iodine and is readily split up by means of acids and alkalies into two molecules of phosphorous acid, for instance, to more than 95% by means of 0.1 N sodium hydroxide solution at room temperature within 30 minutes. In contrast thereto, the new phosphorus compound is only partly hydrolyzed to phosphorous acid, as is shown by test 2 of Table I.

Diphosphorous acid of the formula $H_4P_2O_5$, as described by B. Blaser in "Chemische Berichte," vol. 86, pages 563–582 (1953), is hydrolyzed in acid solution to two molecules of phosphorous acid and is oxidized by iodine in bicarbonate-alkaline solution to hypophosphoric acid. Said diphosphorous acid, however, is not hydrolyzed by sodium hydroxide solution, even if the temperature is raised to 100° C. This is in contrast to the results obtained when proceeding according to tests 3a and 3b of Table I.

The titration values given in said Table I clearly indicate that of said three compounds only pyrophosphorous acid might be present. Since, however, pyrophosphorous acid is almost completely hydrolyzed within 30 minutes by 0.1 N sodium hydroxide solution, and the compound of this example is not, the above tests of Table I show the presence of another and heretofore unknown acid of phosphorus which is of much greater stability in alkaline solution than pyrophosphorous acid. Said new acid is readily split up by hydrolysis by means of 0.1 N hydrochloric acid. Assuming that a mixed anhydride between phosphorous acid and orthophosphoric acid is formed in the above-described Example I, said anhydride corresponding to empirical formula $H_3[HP_2O_6]$ and the structural formula

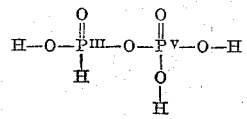

it follows from the titration values that the phosphorus having the oxidation number 3 must be present in an amount of about 34% as anhydride. It is of course understood that said analytical data do not exclude simultaneous formation of higher molecular dehydration products of phosphoric acids and phosphorous acids such as

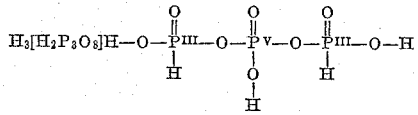

and

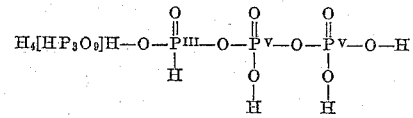

According to most recent publications, hypophosphoric acid of the empirical formula $H_4P_2O_6$ represents a compound in which two phosphorus atoms are linked to each other. Such a compound is tetrabasic and has the structural formula

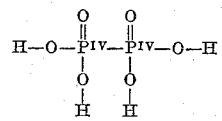

Heretofore, however, it has not been possible to produce hypophosphoric acid by dehydration of phosphorous acid and phosphoric acid, although numerous attempts in this respect have been made for over one hundred years. Consequently, it cannot be considered that hypophosphoric acid is a dehydration product of an acid of phosphorus. Therefore, the above data show that a salt of a new and heretofore unknown acid of phosphorus is produced according to this example.

EXAMPLE 2

A mixture of equimolecular amounts of anhydrous ortho-phosphoric acid and of anhydrous phosphorous acid is dehydrated in a drying pistol over phosphorus pentoxide in a vacuum of 3 to 6 mm. mercury and at a temperature of about 76° C. for one day. The loss of water amounts to 3.85% of the acids employed. 2.4966 gm. of the resulting colorless oily dehydration product are added drop by drop, while stirring vigorously, to a solution of 5 gm. of sodium bicarbonate in 100 cc. of water, which solution is cooled to a temperature between −5° C. and 0° C. The resulting neutral solution is made up to 250 cc. 25 cc. each of said solution are titrated with iodine solution, after hydrolysis, if required, under the conditions given in the following Table II.

*Table II*

CONDITIONS OF HYDROLYSIS

| Test No. | Hydrolyzing Agent | Temperature, ° C. | Duration, Minutes | Consumption of 0.1 N iodine solution in cc. |
|---|---|---|---|---|
| 1 | 0.1 N NaOH | | | 25.71 |
| 2 | 0.1 N NaOH | 25 | 30 | 26.61 |
| 3 | 1.0 N NaOH | 25 | 60 | 26.76 |
| 4 | 0.1 N HCl | 25 | 60 | 27.44 |
| 5 | 2.0 N HCl | 100 | 60 | 27.54 |

Assuming that the new compound corresponds to the formula $Na_3HP_2O_6$, it follows from the titration values that the salts present in the neutralization product contain from about 3% to about 6% of said compound $Na_3HP_2O_6$, having the structural formula

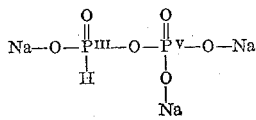

The content of the new compound in the neutralization product cannot be determined more exactly because said value is calculated from the difference in iodine consumption between test No. 1 on the one hand and test No. 4 and No. 5, on the other hand. Thereby a difference of two comparatively large numbers is involved and such a difference, as is well known, is encumbered with considerable inaccuracies.

EXAMPLE 3

A mixture of equimolecular amounts of anhydrous ortho-phosphoric acid and of anhydrous phosphorous acid is heated in a drying pistol over phosphorus pentoxide in a vacuum of 3 mm. to 6 mm. mercury to 110° C. for 8 days. The loss in weight amounts to 9.03%. 0.9512 gm. of the resulting oily product are neutralized as described in Example 2 and are analyzed, partly after hydrolysis, with the following results:

*Table III*

CONDITIONS OF HYDROLYSIS

| Test No. | Hydrolyzing Agent | Temperature, ° C. | Duration, Minutes | Consumption of 0.1 N iodine solution in cc. |
|---|---|---|---|---|
| 1 | 0.1 N NaOH | | | 8.19 |
| 2 | 0.1 N NaOH | 25 | 30 | 9.44 |
| 3 | 1.0 N NaOH | 25 | 60 | 9.89 |
| 4 | 0.1 N HCl | 25 | 60 | 11.67 |
| 5 | 2.0 N HCl | 100 | 60 | 11.74 |

The analytical data given in Table III show that the compound $Na_3HP_2O_6$ having the structural formula

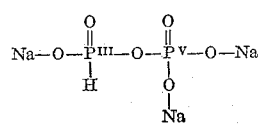

is present in the mixture in an amount of about 20% calculated with respect to the total amount of phosphorus of the oxidation number 3 present therein.

EXAMPLE 4

71 gm. of phosphorus pentoxide and 35.7 gm. of phosphoric acid of the formula $H_3PO_4.0.5H_2O$ are mixed with each other in a ball mill. A faintly yellowish syrup with many undissolved flakes is obtained thereby. 110 gm. of phosphorous acid are added thereto and the mixture is stirred for one hour. The resulting syrup is added drop by drop to a suspension of 615 gm. of sodium bicarbonate in 400 cc. of water at a temperature of about 0° C., while stirring vigorously. The reaction mixture is filtered off by suction and the filter residue is washed twice with ice-cold water. The filtrate is adjusted to a pH of 8.5 by the addition of dilute sodium hydroxide solution. The solution is allowed to stand for 7 days during which time the pH is kept constantly at a pH of 8.5 by occasional addition of dilute sodium hydroxide solution when required.

Subsequently, the entire phosphite present in the filtrate is oxidized by the addition of iodine and sodium bicarbonate. After oxidation is completed, excess iodine is carefully reduced by means of the required amount of hydrazine hydrate. Thereafter, ethanol is added in an amount corresponding to one-fourth of the total volume and the mixture is allowed to stand for 1 hour. The precipitated phosphate is filtered off. Further amounts of ethanol corresponding to twice the volume of the filtrate are then added and the mixture is allowed to stand overnight. An oil which is intermingled with crystals precipitates. The crystals are separated from the oil and the oil is dissolved in three times its volume of water. The amount of phosphate contaminating the resulting solution is determined by analysis. About 1½ times the amount of lead acetate required for precipitating the phosphate is added thereto drop by drop in the form of a 20% aqueous lead acetate solution, while stirring vigorously. The pH-value of the mixture is constantly maintained at a pH of 8.5 by the addition of dilute sodium hydroxide solution when required. Thereafter, the reaction mixture is filtered and 1 gm. of sodium sulfide of the formula $Na_2S.9H_2O$ is added to the filtrate. The precipitated lead sulfide is separated and twice the amount of methanol is added to the filtrate. An oil precipitates which crystallizes on standing overnight. The crystals are composed of the compound $Na_3HP_2O_6.xH_2O$ having the structural formula

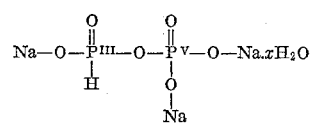

They are, however, contaminated by small amounts of polymer phosphates. The yield is about 59 gm.

In place of sodium bicarbonate, used, for instance, in Example 4 as acid binding neutralizing compound, there can be employed equimolecular amounts of inorganic acid binding compounds, such as sodium hydroxide, sodium carbonate, potassium bicarbonate, potassium hydroxide, potassium carbonate, lithium bicarbonate, ammonia, ammonium bicarbonate, ammonium carbonate, magnesium carbonate, basic magnesium carbonate, magnesium hydroxide, calcium carbonate, calcium hydroxide, or of organic acid binding or neutralizing compounds, such as mono-ethanolamine, di-ethanolamine, triethanolamine, and other alkanolamines, mono-, di- and trimethylamine, mono-, di- and tri-ethylamine, piperidine, pyridine, piperazine, ethylene diamine, trimethylamine diamine, hexamethylene diamine, and others. Otherwise the procedure is the same as that described above in the examples.

EXAMPLE 5

116 gm. NaHCO$_3$ were slowly added to a solution of 16.4 gm. H$_3$PO$_3$ in 40 cc. water. Thereafter, 30.7 gm. POCl$_3$ were added dropwise to this mixture, accompanied by vigorous stirring and while maintaining the solution at −4 to 0° C. During the reaction an additional 40 cc. of water were added. Finally, the reaction mixture was stirred for 20 minutes.

To prove that a new substance was formed, whose properties are different from known substances of similar composition, the phosphite contents of the reaction product and its hydrolyzates produced under various conditions were determined. For this purpose, the entire quantity of reaction product was placed into a graduated flask and diluted to 1 liter; 10 cc. portions of this solution were used for titration. In order to carry out the hydrolysis at a certain alkalinity or acidity, the measured portion of solution was first exactly neutralized, and then a sufficient quantity of base or acid was added to adjust the solution to the normality indicated in Table IV below. The conditions of hydrolysis and the results of the analysis are shown in the table.

Table IV

| Test | Conditions of Hydrolysis | cc. of 0.1 N iodine solution consumed |
|---|---|---|
| A | no hydrolysis | 20.92 |
| B | 0.1 N NaOH, 30 min. at 25° C | 27.42 |
| C | 1 N NaOH, 60 min. at 25° C | 29.20 |
| D | 1 N NaOH, 60 min. at 100° C | 39.85 |
| E | 2 N HCl, 60 min. at 100° C | 39.87 |
| F | 0.1 N HCl, 60 min. at 25° C | 39.27 |

The conditions in test B were chosen in such a way that pyrophosphorous acid had to be more than 95% hydrolized (see Blaser, "Berichte der deutschen chemischen Gesellschaft," vol. 86, p. 572 (1953)). Under the conditions of tests C and D, diphosphorous and hypophosphoric acid are not attacked. Consequently, the products are compounds containing acids of phosphorus having phosphorus atoms with an oxidation number of 5 and phosphorus atoms with an oxidation number of 3, which differ from the phosphorous acids commonly attacked by iodine under these conditions in their stability against hydrolysis. They are not attacked by iodine in alkaline bicarbonate solution.

EXAMPLE 6

A mixture of 13.7 gm. PCl$_3$ and 15.2 gm. POCl$_3$ was added dropwise to a suspension of 84 gm. NaHCO$_3$ in 100 cc. water, while thoroughly stirring and cooling the reaction mixture to temperatures ranging from −5 to 0° C. After the reaction was terminated, the mixture was diluted to 1 liter and analyzed as described in Example 5, using 20 cc. portions of the solution for each test.

Table V

| Test | Conditions of Hydrolysis | cc. of 0.1 N iodine solution consumed |
|---|---|---|
| A | no hydrolysis | 17.02 |
| B | 0.1 N NaOH, 30 min. at 25° C | 28.62 |
| C | 1 N NaOH, 60 min. at 100° C | 33.19 |
| D | 2 N HCl, 60 min. at 100° C | 35.22 |

EXAMPLE 7

588 gm. NaHCO$_3$ were slowly added to a solution of 82 gm. anhydrous H$_3$PO$_3$ in 200 cc. water, accompanied by stirring. Thereafter, 154 gm. POCl$_3$ were added dropwise to this solution while maintaining the reaction mixture at temperatures ranging from −5 to 0° C. and thoroughly stirring the same. During the reaction, three portions of 50 cc. water were added to the mixture. The precipitate formed thereby was then filtered off and washed with 100 cc. water. The filtrate was adjusted to pH 9.5 with dilute NaOH and allowed to stand for several days at room temperature. The pH of the solution decreased somewhat and was adjusted once a day to 8.5 with dilute NaOH. Thereafter, all of the phosphite in the solution was oxidized with iodine in alkaline bicarbonate solution, accompanied by stirring. After the reaction was terminated, the excess iodine accurately reduced with dilute hydrazine hydrate. Subsequently, 200 cc. of 95% ethyl alcohol were added the solution was cooled to about +5° C., and the precipitate was filtered off. The filtrate was admixed with double its volume of ethyl alcohol and allowed to stand overnight at 0° C. An oil having crystals dispersed therethrough separated out. The oil and the crystals were separated from each other by centrifuging. The oil contained the sought-after compound, but by analysis it was found to be contaminated by about 10% orthophosphate. For purification, the oil was dissolved in three times its volume of water. An about 20% aqueous solution of lead acetate was added dropwise to this solution while stirring (about 1½ times the amount theoretically required for complete precipitation of the phosphate), and the pH-value of the solution was held between 8 and 8.5 by adding dilute NaOH dropwise as needed. The precipitate formed thereby was filtered off on a vacuum filter. The filtrate was admixed with 1 gm. Na$_2$S.9H$_2$O, the pH-value was adjusted to 8.5 with a small amount of acetic acid, and the precipitated lead sulfide was filtered off. Thereafter, methanol was added dropwise to the filtrate while stirring, whereby the salt Na$_3$HP$_2$O$_6$.xH$_2$O having the structural formula

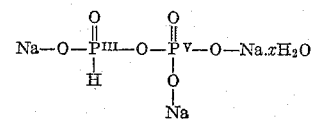

precipitated out. The precipitate first took the form of oil droplets, but as more methanol was added the oil soon changed into a crystalline solid. The crystals were separated by filtration on a vacuum filter, washed with methanol and dried in the open air (1st fraction). In the event the precipitate is not crystalline, the oil can readily be transformed into the crystalline form by a treatment with methanol after separating it from the mother liquor. A second fraction crystallized out of the mother liquor at 0° C. The total yield was about 55 gm.

In principle, the products obtained by the process are salts of heretofore unknown acids of phosphorus. More particularly, they appear to be salts of a mixed anhydride acid of phosphorus having phosphorus atoms with an oxidation number of 5 and phosphorus atoms with an oxidation number of 3 which can be represented by the empirical formula Me$_3$HP$_2$O$_6$ wherein Me is a monovalent metal atom. The structural formula for this new compound is

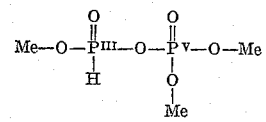

EXAMPLE 8

100 gm. of KHCO$_3$ were added to a solution of 35 gm. K$_2$HPO$_4$ in 40 cc. water. Thereafter, 27 gm. PCl$_3$ were added to this solution over a period of 30 minutes, accompanied by vigorous stirring. The temperature of the solution was maintained between −5 and 0° C. by cooling on an ice-salt bath. Additional 40 cc. water were added to the reaction mixture during the course of the reaction.

⅒ of the resulting reaction solution was separated, diluted to 100 cc. and titrated with iodine. 10-cc. portions were used for each titration. To prove that a new substance was formed which has different properties than substances of similar composition heretofore known, the phosphite contents of the reaction solution and the hydrolyzates produced under various conditions were analyzed. In order to carry out the hydrolysis at a definite alkalinity or acidity, alkali or acid was added to the measured quantity of solution in such amounts that the solution was adjusted to the normality indicated below. The conditions of hydrolysis and the analytical results are shown in Table VI.

*Table VI*

| Test | Conditions of Hydrolysis | cc. of 0.1 N iodine solution consumed |
|---|---|---|
| A | no hydrolysis | 9.80 |
| B | 0.1 N NaOH, 30 min. at 25° C | 17.80 |
| C | 1 N NaOH, 60 min. at 25° C | 20.95 |
| D | 1 N NaOH, 60 min. at 100° C | 32.25 |
| E | 2 N HCl, 60 min. at 100° C | 34.42 |

Under the conditions of test A, the amounts of phosphite and diphosphite present in the reaction mixture were determined. The conditions of test B were chosen in such a way that pyrophosphorous acid, and acids which are similar to pyrophosphorous acids with respect to resistance to hydrolysis, were 95% hydrolyzed (see Blaser, "Berichte der deutschen chemischen Gesselschaft," vol. 86, page 572, 1953). Under the conditions of tests C and D, diphosphorous acid and hydrophosphoric acid are not attacked. Consequently, the products are compounds which contain both phosphorous having an oxidation number of 5 and phosphorus having an oxidation number of 3. They differ from pyrophosphorous acids, diphosphorous acid and hydrophosphoric acid in their resistance to hydrolysis. They are not attacked by iodine in alkaline bicarbonate solution.

The remaining 9/10 of the reaction solution were worked up as follows:

The solution was first allowed to stand for four days while the pH of the solution was maintained constant by periodic addition of dilute potassium hydroxide. Thereafter, the principal amounts of phosphite and diphosphite (and possibly hydrophosphate) were oxidized with bromine and $KHCO_3$; the remainder was oxidized with iodine. After removal of the excess of iodine with hydrazine hydrate solution, a zinc acetate solution was added dropwise in sufficient quantity to precipitate phosphate, or hydrophosphate and pyrophosphate, while the pH was maintained constant at 8.5 by the addition of dilute potassium hydroxide. After separating the precipitate, the solution was admixed with twice its amount of alcohol, whereby an oily substance separated out which had the formula $K_3HP_2O_6 \cdot xH_2O$; this oily product was dried in a desiccator to form a solid mass. The yield was about 8 gm. of impure $K_3HP_2O_6 \cdot xH_2O$ having the structural formula

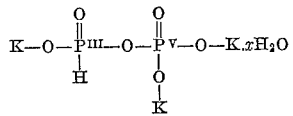

EXAMPLE 9

52 gm. of $NaH_2PO_4 \cdot 2H_2O$ and 120 gm. $Na_2HPO_4 \cdot 2H_2O$ were added to 600 cc. water; the major amount dissolved. Thereafter, 460 gm. $NaHCO_3$ were added to the solution and 138 gm. $PCl_3$ were added dropwise, while stirring and maintaining the temperature below 0° C. After all the $PCl_3$ was added, the solution was filtered and the filter cake was washed with 200 cc. water, and the filtrate was adjusted to a pH of 9.5 with dilute sodium hydroxide. In order to hydrolyze the pyrophosphite and in order to allow the reaction of the pyrophosphite with other acids of phosphorus contained in the solution, the solution was allowed to stand for four days at room temperature; the pH of the solution was readjusted to 8.5 every day. Thereafter, all of the phosphite was oxidized with iodine in alkaline bicarbonate solution accompanied by stirring. After the reaction was complete, the excess iodine was reduced with a calculated amount of dilute hydrazine hydrate solution. Thereafter, 300 cc. of 95% ethyl alcohol were added and the solution was cooled to +5° C. The precipitate formed thereby was filtered off. The filtrate was admixed with twice its volume of ethyl alcohol and cooled to 0° C. An oil containing small crystals separated out, which was allowed to stand for two hours. Thereafter, the oil and the crystals were separated from each other by centrifuging. The oil contained the desired compound but was still contaminated with about 10% orthophosphate, as determined by analysis. For purposes of purification, the impure product was dissolved in three times its amount of water and a 20% solution of lead acetate (about 1½ times the theoretically required quantity for complete precipitation of phosphate) was added dropwise, while stirring, and the pH of the solution was maintained at 8.5 by slowly adding dilute sodium hydroxide. After completion of the reaction, the precipitate was filtered off on a vacuum filter. The filtrate was admixed with 1 gm. $Na_2S \cdot 9H_2O$ and adjusted to a pH of 8.5 with a small amount of acetic acid. The precipitated lead sulfide was filtered off. The salt $Na_3HP_2O_6 \cdot xH_2O$ ($x$=about 8) was then precipitated from the filtrate by the addition of methanol. It first precipitated in the form of an oil, but overnight it transformed into a crystalline solid. The yield was about 50 gm. $Na_3HP_2O_6 \cdot 8H_2O$ having the structural formula

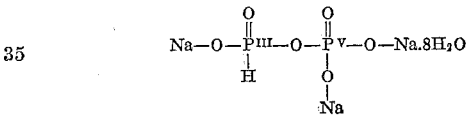

This application is a continuation in part of our co-pending applications, Serial Number 599,282 filed October 5, 1955; Serial Number 577,919, filed April 13, 1956, and Serial Number 578,884 filed April 18, 1956, all now abandoned.

While we have illustrated our invention with certain specific embodiments, it is readily apparent to persons skilled in the art that various changes and modifications can be made in these specific embodiments without departing from the spirit of the invention or the scope of the appended claims.

We claim:

1. Mixed anhydrous compounds of phosphorus having the formula:

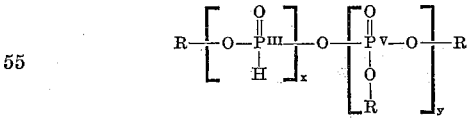

wherein $x$ and $y$ are integers from 1 to 2 and R is a radical selected from the group consisting of hydrogen, $NH_4$, alkali metals, alkaline earth metals and aliphatic organic amines having from 1 to 6 carbon atoms.

2. A dehydrated acid of phosphorus having the empirical formula $H_3(HP_2O_6)$ and the structural formula:

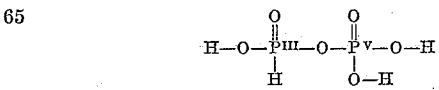

3. The sodium salt of the dehydrated acid of phosphorus having the empirical formula $Na_3HP_2O_6$ and the structural formula:

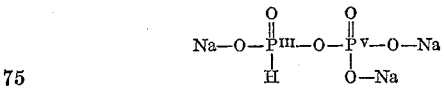

4. The potassium salt of the dehydrate acid of phosphorus having the empirical formula $K_3HP_2O_6$ and the structural formula:

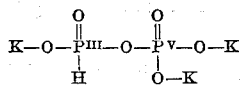

5. A process for producing a mixed anhydrous compound of phosphorus having the formula:

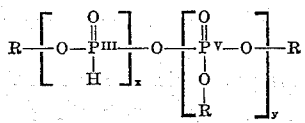

wherein $x$ and $y$ are integers from 1 to 2 and R is a radical selected from the group consisting of hydrogen, $NH_4$, alkali metals, alkaline earth metals and aliphatic organic amines having from 1 to 6 carbon atoms, which comprises partly dehydrating a mixture of (1) an anhydrous acid of phosphorus having only phosphorus atoms with an oxidation number of 5 selected from the group consisting of orthophosphoric acid, pyrophosphoric acid, tripolyphosphoric acid, polyphosphoric acid and metaphosphoric acid and (2) an anhydrous acid of phosphorus having only phosphorus atoms with an oxidation number of 3 selected from the group consisting of phosphorous acid and pyrophosphorous acid, said two acids being in a molecular ratio of from 7:3 to 3:7, by heating in a vacuum to a temperature between about 70° C. and about 120° C. for a time sufficient to split off water from said mixture, removing said water as formed and recovering said mixed anhydrous compound.

6. A process for producing the sodium salts of a mixed anhydrous compound of phosphorus having the formula:

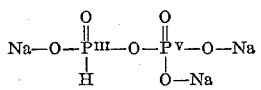

comprising partly dehydrating about an equimolecular mixture of anhydrous ortho-phosphoric acid and anhydrous phosphorous acid by heating in a vacuum to a temperature between about 70° C. and about 120° C. to split off water from said mixture, adding the resulting dehydration product at a temperature not substantially exceeding 0° C. to aqueous sodium bicarbonate, thereby rendering the resulting mixture of substantially neutral reaction, and isolating from the reaction mixture the said sodium salt of an anhydrous compound of phosphorus.

7. In a process of producing the sodium salt of an anhydrous compound of phosphorus having the formula:

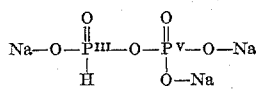

the steps comprising mixing a substantially anhydrous metaphosphoric acid with a substantially anhydrous phosphorous acid to form a dehydration product, adding the resulting syrupy dehydration product to a suspension of sodium bicarbonate in water at a temperature not substantially exceeding 0° C. so as to substantially neutralize the acid dehydration product, filtering the resulting neutralized mixture, adjusting the pH of the filtrate to a pH of 8.5, allowing the filtrate to stand at said pH-value for several days, oxidizing the phosphite present in said filtrate by means of iodine in sodium bicarbonate solution to the corresponding phosphate, removing the phosphate from the filtrate, and precipitating from the substantially phosphate-free filtrate the sodium metal salt of a mixed anhydride of ortho-phosphoric acid and phosphorous acid, said salt having the empirical formula $Na_3HP_2O_6$ and the structural formula:

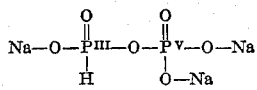

8. A process for producing a mixed anhydrous compound of phosphorus having the formula:

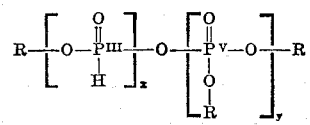

wherein $x$ and $y$ are integers from 1 to 2 and R is a radical selected from the group consisting of hydrogen, $NH_4$, alkali metals, alkaline earth metals and aliphatic organic amines having from 1 to 6 carbon atoms, which comprises reacting aqueous solutions of (1) water-soluble salts of an acid of phosphorus having only phosphorus atoms with an oxidation number of 3 selected from the group consisting of phosphorous acid and pyrophosphorous acid with (2) an inorganic halogen compound of phosphorus having only phosphorus atoms with an oxidation number of 5 selected from the group consisting of phosphorus oxyhalide, pyrophosphoryl halide and phosphorus pentahalide, in a molar ratio of from 7:3 to 3:7 at a temperature below 50° C. and above the freezing point of the reaction mixture and a pH between 3 and 13 inclusive, and recovering said mixed anhydrous compound.

9. A process of producing mixed anhydrous compound of phosphorus having the formula:

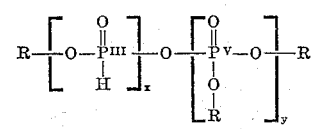

wherein $x$ and $y$ are integers from 1 to 2 and R is a radical selected from the group consisting of hydrogen, $NH_4$, alkali metals, alkaline earth metals and aliphatic organic amines having from 1 to 6 carbon atoms, which comprises reacting substantially equimolar amounts of (1) an inorganic halogen compound of phosphorus having only phosphorus atoms with an oxidation number of 3 selected from the group consisting of phosphorus trichloride and phosphorus tribromide and (2) an inorganic halogen compound of phosphorus having only phosphorus atoms with an oxidation number of 5 selected from the group consisting of phosphorus oxyhalide, pyrophosphoryl halide and phosphorus pentahalide with a water-soluble alkaline-reacting compound in an aqueous solution at a temperature below 50° C. and above the freezing point of the reaction mixture and at a pH above 4 and below 13 inclusive, and recovering said mixed anhydrous compound.

10. A process for producing mixed anhydrous compound of phosphorus having the formula:

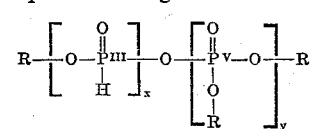

wherein $x$ and $y$ are integers from 1 to 2 and R is a radical selected from the group consisting of hydrogen, $NH_4$, alkali metals, alkaline earth metals and aliphatic organic amines having from 1 to 6 carbon atoms, which comprises reacting aqueous solutions of (1) water-soluble salts of an acid of phosphorus having only phosphorus atoms with an oxidation number of 5 selected from the group consisting of orthophosphoric acid, pyrophosphoric acid, tripolyphosphoric acid, polyphosphoric acid and metaphosphoric acid with (2) an inorganic halogen compound of phosphorus having only phosphorus atoms with an oxidation number of 3 selected from the group consisting of phosphorus trichloride and phosphorus tribromide, in a molar ratio of from 7:3 to 3:7 at a temperature below 50° C. and above the freezing point of the reaction mixture and a pH between 3 and 13, inclusive, and recovering said mixed anhydrous compound.

11. A process of producing the sodium salt of the dehydrated acid of phosphorus having the empirical formula $Na_3HP_2O_6$ and the structural formula:

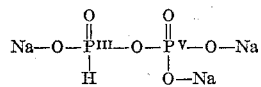

which comprises reacting a saturated sodium phosphite solution with $POCl_3$ in substantially equimolar ratios at a temperature between $-5°$ C. and $+5°$ C. and at pH between 5 and 10 and recovering said sodium salt.

12. A process of producing sodium salts of the dehydrated acid of phosphorus having the empirical formula $Na_3HP_2O_6$ and the structural formula:

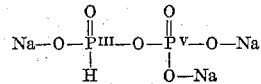

which comprises reacting $PCl_3$ and $POCl_3$ in substantially equimolar ratios with a saturated solution of sodium bicarbonate at a temperature between $-5°$ C. and $+5°$ C. and at a pH between 5 and 10 and recovering said sodium salt.

References Cited in the file of this patent
UNITED STATES PATENTS 2,595,199   Lefforge et al. ---------- Apr. 29, 1952
2,843,457   Pernert ---------------- July 15, 1958

OTHER REFERENCES

"Encyclopedia of Chemical Technology," vol. X, pages 470 and 490, The Interscience Encyclopedia, Inc., 1953.

T. Salzer: Liebigs' Ann., vol. 187, 322 (1877), vol. 194, 28 (1878), vol. 211, 1 (1882), vol 232, 114 (1886).

Van Wazer: "Phosphorus and its Compounds," vol. 1, pages 406–411, Interscience Publishers, Inc., 1958.